(12) United States Patent
Kaliski, Jr.

(10) Patent No.: US 9,363,288 B2
(45) Date of Patent: Jun. 7, 2016

(54) PRIVACY PRESERVING REGISTRY BROWSING

(71) Applicant: Verisign, Inc., Reston, VA (US)

(72) Inventor: Burton S. Kaliski, Jr., Vienna, VA (US)

(73) Assignee: Verisign, Inc., Reston, VA (US)

( * ) Notice: Subject to any disclaimer, the term of this patent is extended or adjusted under 35 U.S.C. 154(b) by 204 days.

(21) Appl. No.: 13/732,815

(22) Filed: Jan. 2, 2013

(65) Prior Publication Data

US 2014/0123301 A1    May 1, 2014

Related U.S. Application Data

(63) Continuation-in-part of application No. 13/660,838, filed on Oct. 25, 2012, now Pat. No. 9,202,079.

(51) Int. Cl.
| | |
|---|---|
| *G06F 17/30* | (2006.01) |
| *H04L 29/06* | (2006.01) |
| *G06F 21/62* | (2013.01) |
| *H04L 29/12* | (2006.01) |

(52) U.S. Cl.
CPC ............ *H04L 63/20* (2013.01); *G06F 21/6218* (2013.01); *G06F 21/6263* (2013.01); *H04L 61/1511* (2013.01); *H04L 61/302* (2013.01); *H04L 61/3025* (2013.01); *H04L 63/0407* (2013.01)

(58) Field of Classification Search
CPC ............... H03M 7/30; G06F 17/30067; G06F 21/6218; G06F 21/31; H04L 63/08; H04L 9/08; H04L 63/0428; H04L 21/64
See application file for complete search history.

(56) References Cited

U.S. PATENT DOCUMENTS

| | | |
|---|---|---|
| 6,745,248 B1 | 6/2004 | Gardos et al. |
| 6,895,430 B1 | 5/2005 | Schneider |
| 6,901,436 B1 | 5/2005 | Schneider |
| 6,973,505 B1 | 12/2005 | Schneider |
| 7,188,138 B1 | 3/2007 | Schneider |
| 7,194,552 B1 | 3/2007 | Schneider |
| 7,409,406 B2 | 8/2008 | Agrawal et al. |

(Continued)

FOREIGN PATENT DOCUMENTS

| | | |
|---|---|---|
| JP | 2005167967 A | 6/2005 |
| WO | 9909726 | 2/1999 |
| WO | 0122286 | 3/2001 |

OTHER PUBLICATIONS

Federrath et al, "Privacy-Preserving DNS: Analysis of Broadcast, Range Queries and Mix-based Protection Method", 2011.*

(Continued)

*Primary Examiner* — Hung Le
(74) *Attorney, Agent, or Firm* — Artegis Law Group, LLP

(57) ABSTRACT

A method, system, and computer-readable memory containing instructions include requesting a tokenizing authority to provide a tokenized string that represents a domain name, using the tokenized domain name string to perform a lookup against a database of registered tokenized domain name strings, determining whether the tokenized domain name string exists in the database, and returning results based on the existence of tokenized domain name strings and optionally variants thereof. The method, system, and computer-readable memory may further include returning an encryption key corresponding to an encrypted record of information related to the domain name corresponding to the tokenized domain name string.

15 Claims, 9 Drawing Sheets

(56) References Cited

U.S. PATENT DOCUMENTS

| | | | |
|---|---|---|---|
| 7,558,970 | B2 | 7/2009 | Bellovin et al. |
| 7,565,402 | B2 | 7/2009 | Schneider |
| 7,698,425 | B2 * | 4/2010 | Thayer et al. .................. 709/225 |
| 7,698,426 | B2 * | 4/2010 | Thayer et al. .................. 709/225 |
| 7,707,039 | B2 * | 4/2010 | King ................ G06F 17/30864 382/305 |
| 7,711,727 | B2 | 5/2010 | Agrawal et al. |
| 7,742,953 | B2 * | 6/2010 | King ...................... G06F 17/218 235/380 |
| 7,823,207 | B2 | 10/2010 | Evenhaim |
| 7,979,711 | B2 | 7/2011 | Chen et al. |
| 8,037,168 | B2 | 10/2011 | Schneider |
| 8,117,339 | B2 * | 2/2012 | Adelman et al. .............. 709/245 |
| 8,140,502 | B2 | 3/2012 | Francis et al. |
| 8,224,994 | B1 | 7/2012 | Schneider |
| RE43,690 | E | 9/2012 | Schneider et al. |
| 8,332,655 | B2 | 12/2012 | Gupta |
| 8,380,720 | B2 | 2/2013 | Chang et al. |
| 8,429,421 | B2 | 4/2013 | Chase et al. |
| RE44,207 | E | 5/2013 | Schneider |
| 8,458,161 | B2 | 6/2013 | Schneider |
| 8,612,565 | B2 | 12/2013 | Schneider |
| 8,635,340 | B1 | 1/2014 | Schneider |
| 8,739,243 | B1 * | 5/2014 | Martini ............................. 726/1 |
| 8,874,932 | B2 | 10/2014 | Gupta |
| 2004/0199520 | A1 * | 10/2004 | Ruiz et al. ...................... 707/100 |
| 2004/0199608 | A1 * | 10/2004 | Rechterman et al. .......... 709/220 |
| 2005/0055327 | A1 | 3/2005 | Agrawal et al. |
| 2005/0166046 | A1 * | 7/2005 | Bellovin et al. ............... 713/165 |
| 2005/0259817 | A1 | 11/2005 | Ramzan et al. |
| 2005/0289084 | A1 * | 12/2005 | Thayer ............... G06Q 20/3674 705/67 |
| 2007/0118884 | A1 | 5/2007 | Ozaki et al. |
| 2007/0208714 | A1 | 9/2007 | Ture et al. |
| 2007/0282796 | A1 | 12/2007 | Evenhaim |
| 2008/0016233 | A1 | 1/2008 | Schneider |
| 2008/0059607 | A1 | 3/2008 | Schneider |
| 2008/0072039 | A1 | 3/2008 | Relyea |
| 2008/0183703 | A1 | 7/2008 | Agrawal et al. |
| 2008/0235507 | A1 * | 9/2008 | Ishikawa ............. H04L 63/0428 713/150 |
| 2008/0270418 | A1 * | 10/2008 | Chen et al. ........................ 707/10 |
| 2008/0313352 | A1 * | 12/2008 | Telesco .......................... 709/245 |
| 2009/0041253 | A1 * | 2/2009 | Chen ....................... H04L 9/321 380/282 |
| 2009/0327296 | A1 | 12/2009 | Francis et al. |
| 2010/0106980 | A1 * | 4/2010 | Kerschbaum ......... H04L 9/3013 713/193 |
| 2010/0114964 | A1 | 5/2010 | Kerschbaum et al. |
| 2010/0146299 | A1 | 6/2010 | Swaminathan et al. |
| 2010/0153403 | A1 | 6/2010 | Chang et al. |
| 2010/0153535 | A1 * | 6/2010 | Thayer et al. .................. 709/223 |
| 2010/0198846 | A1 | 8/2010 | Gupta |
| 2010/0269174 | A1 * | 10/2010 | Shelest ........................... 726/22 |
| 2010/0318546 | A1 | 12/2010 | Kenthapadi et al. |
| 2010/0318782 | A1 | 12/2010 | Auradkar et al. |
| 2011/0055248 | A1 * | 3/2011 | Consuegra et al. ........... 707/769 |
| 2011/0145580 | A1 | 6/2011 | Auradkar et al. |
| 2011/0296176 | A1 | 12/2011 | Ashrafi et al. |
| 2012/0036114 | A1 * | 2/2012 | Kim ....................... G06Q 10/10 707/700 |
| 2012/0159180 | A1 | 6/2012 | Chase et al. |
| 2012/0330902 | A1 | 12/2012 | Gupta |
| 2013/0104229 | A1 * | 4/2013 | Brennan, III ................... 726/22 |
| 2013/0262852 | A1 | 10/2013 | Roeder et al. |
| 2013/0339751 | A1 | 12/2013 | Sun et al. |
| 2014/0052984 | A1 * | 2/2014 | Gupta ................... H04W 12/06 713/162 |

OTHER PUBLICATIONS

Zhao et al, "Analysis of Privacy Disclosure in DNS Query", 2007.*
Final Office Action dated Apr. 1, 2014, U.S. Appl. No. 13/660,838, filed Oct. 25, 2012, 21 pages.
Steven M. Bellovin et al. "Privacy-Enhanced Searches Using Encrypted Bloom Filters," International Association for Cryptologic Research, vol. 20040201:185825, Feb. 1, 2004, pp. 1-12.
Dan Boneh et al. "Conjunctive, Subset, and Range Queries on Encrypted Data," Theory of Cryptography, Lecture Notes in Computer Science 4392, Feb. 21, 2007, pp. 535-554.
Annonymous, "Tokenization (data security)," Wikipedia, the free encyclopedia, http://en.wikipedia.org/w/index.php?title=Tokenization_(data_security)&oldid=517346331, Retrieved on Mar. 12, 2014, pp. 1-2.
Extended European Search Report dated Mar. 21, 2014 issued in European Application No. 13189842.1 filed Oct. 23, 2013, pp. 1-6.
Partial European Search Report dated Mar. 21, 2014 issued in European Application No. 13189843.9 filed Oct. 23, 2013, pp. 1-6.
Chang et al, "Privacy Preserving Keyword Searched on Remote Encrypted Data," Division of Engineering and Applied Sciences, Harvard University, 2006, 14 pages.
Kumar et al., "On Anonymizing Query Logs via Token-based Hashing," WWW 2007, May 8-12, 2007, pp. 629-638.
Liu et al., "An Efficient Privacy Preserving Keyword Search Scheme in Clouding Computing," 2009 International Conference on Computational Science and Engineering, 2009, pp. 715-720.
Non-Final Office Action dated Dec. 19, 2013, U.S. Appl. No. 13/660,838, filed Oct. 25, 2012, 53 pages.
Warwick Ford et al., "Server-Assisted Generation of a Strong Secret from a Password", In WETICE '00 Proceedings of the 9th IEEE International Workshops on Enabling Technologies: Infrastructure for Collaborative Enterprises, IEEE, 2000, 5 pages.
Unknown Author, RSA Tokenization Server, RSA, The Security Division of EMC, 2 pages http://www.rsa.com/services/pdfs/10160_TOKEN_DS_0410.pdf, accessed Dec. 2, 2011.
Unknown Author, Trademark Clearinghouse: Draft Implementation Model, ICANN, Apr. 13, 2012, 46 pages.
Anthony Ha, Facebook to Roll Out Email- and Phone Number-Based Ad Targeting Next Week, TechCrunch, Aug. 30, 2012, 2 pages.
Emiliano De Cristofaro et al., "Fast and Private Computation and Set Intersection Cardinality", IACR ePrint, Oct. 2, 2012, 14 pages.
Myungsun Kim et al., "Private Top-k Aggregation Protocols", IACR ePrint, updated Oct. 24, 2012, 15 pages.
Non-Final Office Action dated Nov. 20, 2014, U.S. Appl. No. 13/660,838, filed Oct. 25, 2012, pp. 1-24.
Extended European Search Report dated Jan. 23, 2015, European Application No. 13189843.9 filed Oct. 23, 2013, pp. 1-.
Final Office Action dated Mar. 5, 2015, U.S. Appl. No. 13/660,838, filed Oct. 25, 2012, pp. 1-33.
Claus Boyens et al., "Using Online Services in Untrusted Environments: A Privacy-Preserving Architecture", ECIS 2003 Proceedings, Jan. 2003, pp. 1-16.
Notice of Allowance and Fees Due dated Jul. 22, 2015, U.S. Appl. No. 13/660,838, pp. 1-21.

* cited by examiner

PRIVACY PRESERVING REGISTRY BROWSING

CROSS-REFERENCE TO RELATED APPLICATIONS

This application is related to co-pending U.S. application Ser. No. 13/660,838, filed Oct. 25, 2012, entitled "Privacy Preserving Data Querying," by the same inventor herein, assigned or under obligation of assignment to the same entity as this application, which application is incorporated herein by reference in its entirety, and from which application this application is a continuation-in-part.

TECHNICAL FIELD

This disclosure generally relates to domain name registrations, and the processing and querying of lists of registered domain names or other secure or archived lists. In particular implementations, this disclosure relates to methods and systems for preserving the privacy of queries for domain name information of various types.

BACKGROUND

The domain name system (DNS) and domain name registration system have become an integral part of how consumers and businesses conduct activity on the Internet. Among other things, the DNS environment allows businesses to register familiar designations, identifiers, or other monikers associated with products or services so that Internet users can use these monikers rather than the routing Internet protocol (IP) address that identifies a website associated with the moniker.

The DNS system works by an interrelation of entities including registrants, registrars, and registries. For example, registries maintain operative control over a top level domain (TLD), such as the traditional .COM, .NET, .ORG, .EDO, and .GOV, as well as the newer .BIZ, .INFO, and .NAME TLDs, in addition to all the other available generic TLDs (gTLDs) and country-code TLDs (ccTLDs). Registrants are the entities that register the use of a domain name in a specific TLD for a finite time. Registrars mediate the transactions between the registrants and each registry. Registrars receive and process the registrants' domain name reservation requests, and provide tools and an interface to the registrant to maintain operation of its reserved names.

Registries in turn receive and process requests from registrars and provide the registrars with tools to maintain operation of the reserved names of their customers (the registrants). The registry makes mechanisms available to reserve and update domain name registrations through the Extensible Provisioning Protocol (EPP), or other, similar functions or services. Registrars, who are authorized by the registry, have the ability to make reservations and check the state of domain names through the EPP. The registry provides the EPP as a communications gateway to registrars for such purposes.

Typically when a potential domain name registrant desires to register a domain name, the registrant will visit a registrar's web site to determine whether the selected name is available for the desired top-level-domain (TLD), e.g., .COM, .NET, .ORG, etc. The selected registrar may have relationships with several registries controlling different gTLDs and ccTLDs. The potential registrant will typically enter a domain name of interest, such as "MyCompanyName," and submit the name to the registrar. The registrar will receive the domain name and process the domain name search request by querying the different TLD registries for which it has a registrar relationship over a real-time or near real-time interface. The registrar then receives an indication from each registry whether the domain name is available for different TLDs. If the domain name of interest is not available for the preferred TLD, the registry or registrar may provide the registrant with alternative domain names that are available for the preferred TLD or other TLDs. The registrant may then select domain names for registration and obtain a registration of the domain name, typically by paying registration fees, providing information required by the registry and registrar, and/or carrying out other steps. The registry typically charges the registrar for the domain name registration, and the registrar collects its registration fee from the registrant.

A method and system is desired that can provide a way of preserving privacy during domain name lookup and other operations by potential registrants. The following disclosure further expands upon these concepts by offering a solution to preserve privacy for other types of data retrieval related to domain names or other lists or registration. As described below, the subject systems and methods can in one aspect allow users to query a domain name for its availability and associated information without revealing the domain name.

SUMMARY

A method, system, and computer-readable memory containing instructions for preserving privacy of a domain name related request can include receiving a request for information related to a domain name, wherein the request comprises at least one tokenized string representing the domain name; comparing the at least one tokenized string to a store of tokenized strings; determining if the at least one tokenized string is contained in the store of tokenized strings; and returning an indication whether the at least one tokenized string is contained in the store of tokenized strings.

In one implementation, the domain name related request is a request for determining whether a domain name is available for registration. Optionally, other implementations may also include features where the tokenized string is subdivided prior to tokenization such that each subdivided part is tokenized separately. Some implementations may also generate variants of the tokenized domain name by combining tokenized terms.

In another implementation, the domain name related request is a request for information pertaining to the domain name, such as an IP address, name server data, WHOIS data, and the like. In response, the requested information may be returned which may be optionally encrypted in whole or in part with an encryption key based on the domain name.

In another implementation, the domain name may be pre-processed prior to tokenization, for example with blinding, cryptographic, or data processing functions. The result of tokenization may then be post-processed before submission to a tokenized list holder to determine whether the domain name is available for registration or to retrieve information associated with the domain name.

In another implementation, a tokenizing authority, which transforms a domain name into a token and optionally provides encryption and decryption keys based on the domain name, maintains the flow and control of the processes as they have been described herein. In another implementation an entity such as a user or potential registrant submitting a domain name for lookup maintains the flow and control of the processes as they have been described herein. In another implementation the registrar, registry, or tokenized list holder can maintain the flow and control of the operations, as described herein.

It is to be understood that both the foregoing general description and the following detailed description are examples and explanatory only, and are not restrictive of the subject matter, as claimed.

The accompanying drawings, which are incorporated in and constitute a part of this specification, illustrate implementations of the application and together with the description, serve to explain the principles of the application.

DETAILED DESCRIPTION

Figure 1:
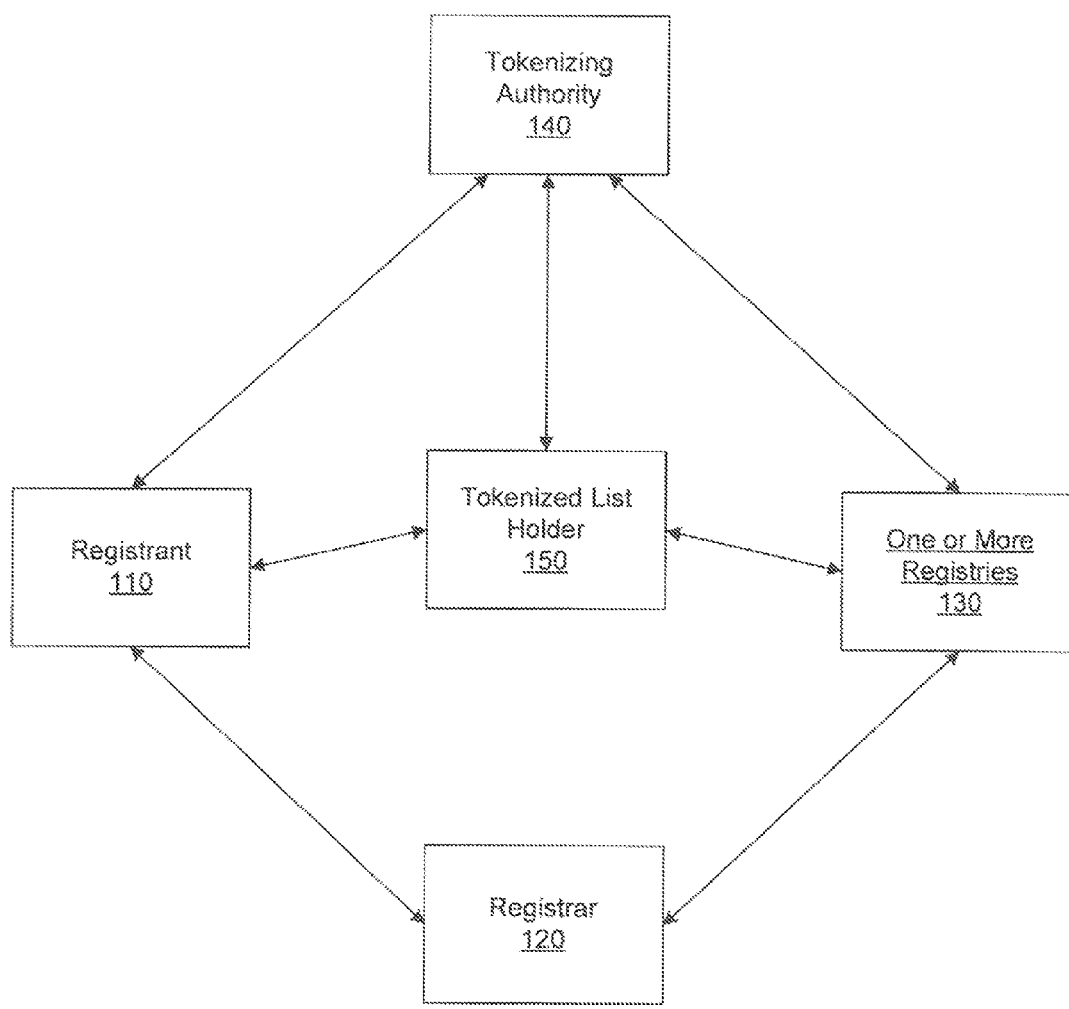
FIG. 1 illustrates an exemplary data flow and relationship between entities involved in a domain registration transaction, according to implementations.

Reference will now be made in detail to the example implementations. Where possible, the same reference numbers may be used throughout the drawings to refer to the same or like parts.

In a typical domain name registration example, a registrant may want to reserve the domain name "ExampleName.com." To do so, the registrant would contact a registrar with a business relationship with the registry operating the .COM TLD. The registrant would query the registrar about the availability of the domain name "ExampleName" in the ".COM" namespace. If the "ExampleName.com" domain name were unavailable for the .COM TLD, the registrar may suggest alternative domain names at other TLDs or at the .COM TLD with names similar to "ExampleName," e.g., ExampleNameOnline.com, ExampleNameWeb.net, myExampleName.org, etc.

Under the known registration process above, when a user as a potential registrant submits a domain name to a registrar to determine availability of the domain name, the user must disclose information, including the desired domain name, which the user may consider to be confidential, private, or sensitive. At the least, this disclosure would entrust the registrar with the knowledge that the user has an interest in the domain name or possible variants. Implicitly, the user is also entrusting at least one registry for the TLD of interest with this information, as well. In many cases, the registrar will share the domain name with other registries to determine availability of the domain name with other TLDs. Further, if any of these availability queries are transmitted or received over an unencrypted transmission channel, then there is a risk of this information being distributed to unintended parties. Further still, if the query is logged, that information is subject to discovery through security breaches, court orders, or other means.

There may be several reasons why a user would want to keep domain query information private. For example, the user may not want the registrar to collect data on the user's searches because that data could be used in an anticompetitive way, unknowingly shared to others to some degree, used to profile the user's interests, or used to provide unwanted marketing materials. Also, some registrars (or others that may come across the domain name query in the information chain) may put a temporary lock on the domain name so that it could not be registered through a competing registrar. This can create the possibility that others may register and hold the domain name temporarily to profiteer on the ingenuity of the user by offering to transfer registration for a fee in excess of normal registration fees. In another example, a scenario can be imagined where, in determining a product name for a secret soon-to-be-launched device, a vendor may be querying the availability of various potential product names to identify an accompanying website address for the new product. Such queries, if known, could be used to the disadvantage of the vendor, for instance by leaks about the pending product release. As another example, a potential registrant may be subject to a non-disclosure agreement which may conceivably be violated based on domain registration queries.

Implementations of the present teachings can incorporate an architecture for domain name registrations which introduces an intermediary entity referred to as a "tokenizing authority." The tokenizing authority hosts and employs a tokenization function to encode a list of domain names or other information for secure storage and lookup purposes. For example, a tokenizing authority may tokenize a list of all registered domain names for a particular TLD. The tokenizing authority may then receive a domain name query from a potential registrant or other user, service, or requester, tokenize the domain name using the same tokenization function, and compare the tokenized domain name with the list of already-existing tokenized registered domain names. If the tokenized domain name does not appear in the list of tokenized registered domain names, then that domain name can be designated or identified as being currently available to register. This approach shields the actual domain name requested by the user from becoming known to registrars and registries. In addition, the tokenizing authority can also generate a set of encryption key information to encrypt data that is associated with the tokenized domain name or other data objects. In implementations described herein, the set of encryption key information can include an encryption key which is seeded or generated based on the domain name or other requested data object. The domain name or other data object of interest can then be stored, queried, and maintained in a more secure manner than with conventional methods which establish and operate a domain name registry or other repository.

In implementations, the tokenized list may be maintained by a separate entity, or by the original registry associated with the TLD. In the latter case, the tokenizing authority may receive the registered domain names from the registry, tokenize each name, and return a list of tokenized domain names back to the registry, which may act as a tokenized list holder. In another implementation, only the second level name (e.g., "ExampleName" in "ExampleName.com") may be tokenized, and then compared to a list of tokenized registered domain names organized by TLD (or queried against a tokenized database of registered domain names from each TLD registry). This allows a registrar to respond with alternative available TLD options without knowing the second level domain name.

FIG. 1 illustrates an overall environment, system, data flow, and associated relationships between entities involved in a domain registration, according to implementations of the present teachings. As shown in FIG. 1, the system 100 may include one or more registrants 110, one or more registrars 120, one or more registries 130, at least one tokenizing authority 140, and at least one tokenized list holder 150. Although not shown, system 100 may also include one or more networks that allow the one or more registrants 110, one or more registrars 120, one or more registries 130, at least one tokenizing authority 140, and at least one tokenized list holder 150 to communicate with one another over any combination of wired and/or wireless networks, many of which are known in the art.

A registrant 110, as referred to herein, can be or include any entity or user seeking to register or prospectively register a domain name or other data object or asset. In cases, the registrant 110 can be an end user or entity seeking to establish and operate a web site or other network portal or resource, on their own behalf. In cases, the registrant 110 can also potentially be or include other parties or entities, such as an automated service or application which is programmed to seek registration of a domain name based on various conditions. The registrant 110 may seek to register or prospectively register a domain name using, for example, a computing device. The computing device used by registrant 110 may include one or more processors, one or more memory units, a network interface that enables registrant 110 to communicate with registrar 120, registries 130, tokenizing authority 140, and/or tokenized list holder 150 over any combination of a wired and/or wireless network.

As noted, while the registrant 110 can be an end user of the domain, in some cases, the registrant 110 may also seek to resell the domain to another registrant 110 in a domain transfer transaction. In other cases, the registrant 110 may retain ownership of the domain but license a third party use it, as when the registrant 110 is a web hosting provider and the third party is a customer of the registrant 110. Moreover, in still other cases, the registrant 110 may not intend to use a domain in a traditional fashion. For example, some registrants 110 may seek to reserve domain names which they perceive to be desirable such that they can sell those domain names for a profit. Other registrants 110 may reserve a name which is a slight variation of an existing and popular website, hoping to receive Internet traffic from people mistyping the URL of the popular website. Still other registrants may be computers performing an algorithm to automatically find and register domain names. Some registrants 110 will find further alternative ways, in addition to those described above, to use the domain name system, other than for the traditional use of hosting websites associated with the domain name that directs a user to a website. In general, however, the purposes for which registration is pursued do not affect the various security and other mechanisms described herein.

A registrant 110 may have an interest in preserving the privacy of their domain name availability queries. Thus, rather than perform a typical domain name availability request, the registrant 110 may use a service consistent with this disclosure to perform the domain name availability request, and receive an answer regarding the availability of the desired domain name. In implementations, a registrant 110 may simply be considered a user requesting information about a domain name in the broadest sense. Such information may include, but not be limited to, domain name availability, domain name record information, registrant information, WHOIS information, domain name creation and expiration dates, domain name registry lock status, name server information, and the like. Specific examples of such implementations will be described in further detail below.

The registrant 110 typically reserves a domain name from a registrar 120. Thus, the registrant's 110 relationship is primarily with the registrar 120. The registrar 120, however, may maintain a relationship with one or more registries 130 that control the TLD for which registration is desired. Typically, large registrars 120 will have relationships with many registries 130 to assure they can provide registrants 110 with many TLD domain options when reserving the requested or desired domains. The abstraction between the one or more registries 130 and registrant 110 may be convenient to the registrant 110 because the registrant 110 can register all or most of its domain names from one registrar 120, rather than requiring relationships or interactions with multiple registries 130 within the set of one or more registries 130.

The one or more registries 130 control the assignment of domain names. Each registry 130 in the set of one or more registries 130 is responsible for assuring the accuracy of the domain registration information it maintains. Further, each registry 130 is responsible for resolving requests for the domain names for the TLD over the DNS protocol. For example, the registry 130 that manages the .ORG TLD must provide, or otherwise make available, a DNS server containing nameserver information for a domain name registered through that registry 130, so that when a website is requested via the domain name in a URL, the proper nameserver will eventually respond to the request. To do so, the subject registry 130 directs the requester 110 to the nameserver designated as responsible to respond for the website's domain names. The registrar 120 and one or more registries 130 can each comprise one or more servers, other computers, applications, logic, and/or services to implement the functions described herein.

It should be understood that the registrant 110, registrar 120, one or more registries 130, and any combinations thereof may be owned, maintained, or operated by the same entity. It should also be understood that a registrant 110 can at times act like a registrar 120 by reserving and distributing domain names through a domain transfer mechanism, for instance via reselling or auction activity.

In implementations as shown, a tokenizing authority 140 may interact with each of the registrant 110, registrar 120, or one or more registries 130 through a privacy preserved domain availability request transaction (or "lookup"). The tokenizing authority 140 may provide tokenized domain names, domain name parts, and/or other information that may be derived or generated using one or more tokenizing algorithms. In implementations, one-way tokenizing algorithms may be used. Such algorithms receive a string of characters as an input, and return a tokenized string of characters based on the tokenizing algorithm(s). The algorithm(s) may be modified, reseeded, or substituted as needed to help protect against reverse engineering and the unauthorized decrypting of tokenized strings.

In implementations, the tokenizing authority 140 can be a direct responder to a privacy protected domain name lookup request. The tokenizing authority 140 can, in implementations, for instance be hosted in a tokenizing authority server, and/or in a network-based application or service, including a cloud-based application or service. Such would be the case where the tokenizing authority 140 maintains a list of tokenized registered domain names, and responds to queries against that list. In some implementations, the tokenizing authority 140 may be implemented or hosted by either the registrar 120 or the one or more registries 130, and may share hardware resources to implement the tokenizing functionality. In particular, this may be the case in implementations where a blinding or other pre-processing function is used to keep the domain name private from the tokenizing authority 140, as discussed further below.

A tokenized list holder 150 may store a list of tokenized domain names and other information. The tokenized list holder 150 may store information related to the tokenized domain names, or other registered lists, in a whole or partially encrypted form. The tokenized list holder 150 may receive a tokenized string from a potential registrant 110 (or domain related information requester), compare the tokenized string to its list of tokenized strings, and return an indication whether the tokenized string was found in the list of pre-existing stored tokenized strings. In addition, the tokenized list holder 150 may receive a tokenized string from a potential registrant 110 (or domain related information requester) and provide information related to the tokenized string. Some or all of the data may be encrypted with one or more encryption keys which are seeded, encoded, and/or otherwise generated based on the subject domain name, itself. The tokenized list holder 150 may be an entity related to, or hosted by, the tokenizing authority 140.

The tokenizing authority 140 and tokenized list holder 150 may be implemented in software as software modules or programs that may be stored on one or more local or remote computing systems. For example, the functionality of the tokenizing authority 140 and tokenized list holder 150 may each comprise one or more applications, including computer-readable instructions which, when executed by a processor, cause one or more computers to perform steps of a method. In implementations, the architecture illustrated in FIG. 1 may support execution of program code on one or more computers to accomplish the overall system and method. Computer-readable instructions may be stored on a computer-readable medium, without limitation such as a memory or disk. Such media typically provide non-transitory storage. One or more of the components depicted in FIG. 1 may be hardware components or combinations of hardware, software, operating system and other resources, such as, for example, special purpose computers or general purpose computers. In implementations, one or more of the components shown in FIG. 1 can also or instead be implemented in the form of physical or virtual network-based software or services. Any one or more of those components can for instance be hosted or implemented using cloud-based networks.

A computer or computer system, such as those that may comprise any of the components illustrated in FIG. 1, may also include internal or external databases. The database may comprise one or more individual databases or databases configured to act together. The database may be implemented in a commercial, open source, or proprietary database program or may be contained in log files, fiat files, or any other data storage mechanism. The database may alternatively be referred to as a data store, store, or storage. The components of a computer or computer system may, among other things, connect through a local bus interface or over a local or wide area network, either individually or any combination thereof. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections. In implementations, some or all of the entities and resources shown in FIG. 1 can also be implemented in a cloud-based network, or other distributed platform, network, service, or system.

Figure 2:
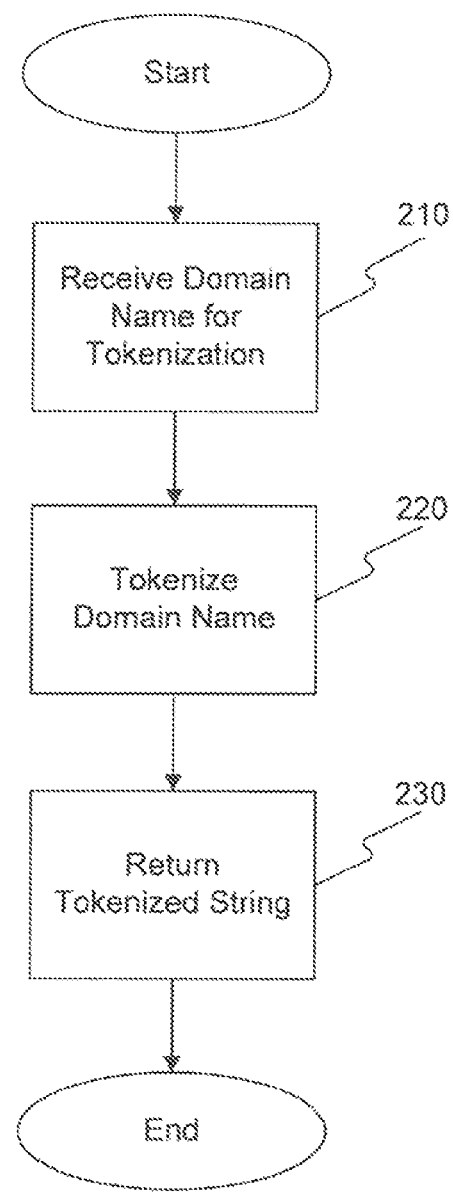
FIG. 2 illustrates an example process executed by a tokenizing authority to tokenize a domain name.

FIG. 2 illustrates an example process 200 executed by a tokenizing authority 140 to tokenize a domain name. The process 200 can be executed by the tokenizing authority 140 in the context of tokenizing both a domain name availability query and domain names that have already been registered. For example, the process 200 can be executed by the tokenizing authority 140 upon receiving a domain name availability query from a potential registrant 110. In step 210, the tokenizing authority 140 can receive the domain name for tokenization. In the case where the tokenizing authority 140 provides a tokenized version of a domain name for a potential registrant 110, the domain name may typically be received directly from the potential registrant 110. In the case where the tokenizing authority 140 provides a tokenized version of the domain name that has already been registered, the domain name may be received from the one or more registries 130, or from a third party offering tokenization registration services in cooperation with a registry 130. The third party could be a registrar 120, or another party providing registration support for privacy preserving domain name lookups. In either case, in some embodiments, the tokenizing authority 140 may be configured to receive multiple domain names at once through batch processing.

In step 220, the tokenizing authority 140 can tokenize the domain name. In tokenizing the domain name, the tokenizing authority 140 may optionally run a separation algorithm on the domain name to spilt the domain name into two or more distinct segments or pieces, and tokenize those pieces independently. For example, the domain name "ExampleName.com" could be spilt into two strings "ExampleName" and ".com." Each of these strings in turn may be tokenized separately. Thus, the information being tokenized can either be a fully qualified domain name (FQDN) such as "ExampleName.com" or a portion of a FQDN such as a label "ExampleName" or some other portion such as "Example". (In this example, only two levels of labels are given, but in longer domain names, third, fourth or other levels, or multiple levels, or other portions, could be tokenized, and searched in a repository of information of the appropriate type. If only the second-level label, i.e., "Example" is tokenized and searched, then the appropriate repository may be one in which the first-level label, i.e., "com", is a known and agreed value.) With separate tokenization strings, in the event that the desired domain name is unavailable for registration, the one or more registries 130 may be able to suggest alternative names even though they may not know either the desired name or the pieces of the desired name. This will be explained in greater detail below. As another example, the domain name "ExampleBlaster.com" could be split into three strings, "Example," "Blaster," and "com." Alternatively, the TLD portion need not be tokenized at all. Thus, in this example the word "Example" and "Blaster" would be tokenized, but "com" would not. This would allow a registrar 120, the one or more registries 130, or tokenized list holder 150 to more easily provide at least alternative TLDs to the TLD specified in the privacy preserving domain name query.

In one implementation, an algorithm to develop variants may be run by the potential registrant 110 prior to submission to the tokenizing authority 140. For example, the one or more registries 130 may provide software or services to the potential registrant 110 to analyze the desired domain name and automatically develop variants. Such variants may be developed using any known or later-developed algorithms suited to producing variants. The variants may then be submitted to the tokenizing authority 140 together for tokenization.

In step 230, the tokenizing authority 140 returns the tokenized string or strings, including a separator between strings when, for example, a domain name was split before tokenization. If tokenizing multiple domain names in a batch process, the tokenizing authority 140 may preserve the order for the convenience of the potential registrant 110. In the case where the tokenized list holder 150 may also be the one or more registries 130, the tokenizing authority 140 may mix up the order so that the registry 130 could not associate the tokenized strings with their submitted untokenized counterparts, assuming the tokenized string in a subsequent lookup request is visible to the one or more registries 130.

Figure 3:
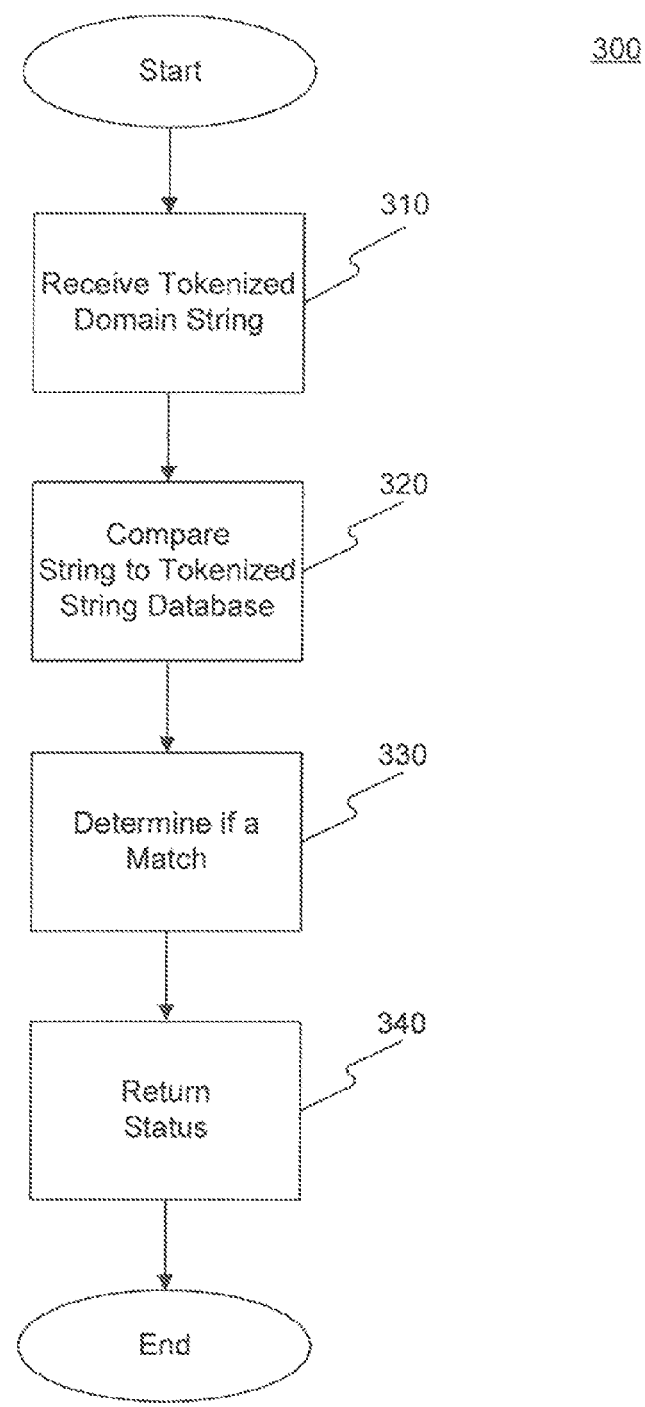
FIG. 3 illustrates an example process of determining whether a domain name has been registered while preserving privacy of the domain name query by using tokenized domain name strings, according to implementations.

FIG. 3 illustrates an example process 300 of determining whether a domain name has been registered while preserving privacy of the domain name query by using tokenized domain name strings. A potential domain name registrant 110 can submit a tokenized domain name, such as, for example, the tokenized domain name received from step 230, to a tokenized list holder 150. The tokenized domain name may be submitted to the tokenized list holder 150 via an intermediary, such as a privacy preserving domain name supporting registrar 120, or submitted directly to the tokenized list holder 150. In step 310, the tokenized list holder 150 may receive the tokenized domain string (or strings if the tokenization process optionally developed variants by splitting or other means). In step 320, the tokenized list holder 150 may compare the tokenized domain string to the tokenized list. In step 330, the tokenized list holder 150 can determine whether a match occurs between the tokenized domain string and the tokenized list. If a match occurs, then the domain name is determined to be unavailable for registration because it already exists in the tokenized list. If no match occurs, then the domain name can be assumed to be available for registration. In step 340, the determination reached by the matching process is returned and passed along to the user. Thus, for example, in implementations where a requested domain name is not available for registration, that result can be transmitted to the potential registrant 110. In cases where a match occurs, for example, the information corresponding to the domain name may be returned, such information being optionally encrypted using one or more encryption keys based on the domain name, as further described herein.

The example process 300 preserves privacy of the domain name from the one or more registries 130, but still requires the tokenizing authority 140 to be trusted by the potential registrant 110. Even so, it significantly reduces the risk that the domain name of interest would be revealed to any registrar 120 or registry 130 in the domain lookup process.

Figure 4:
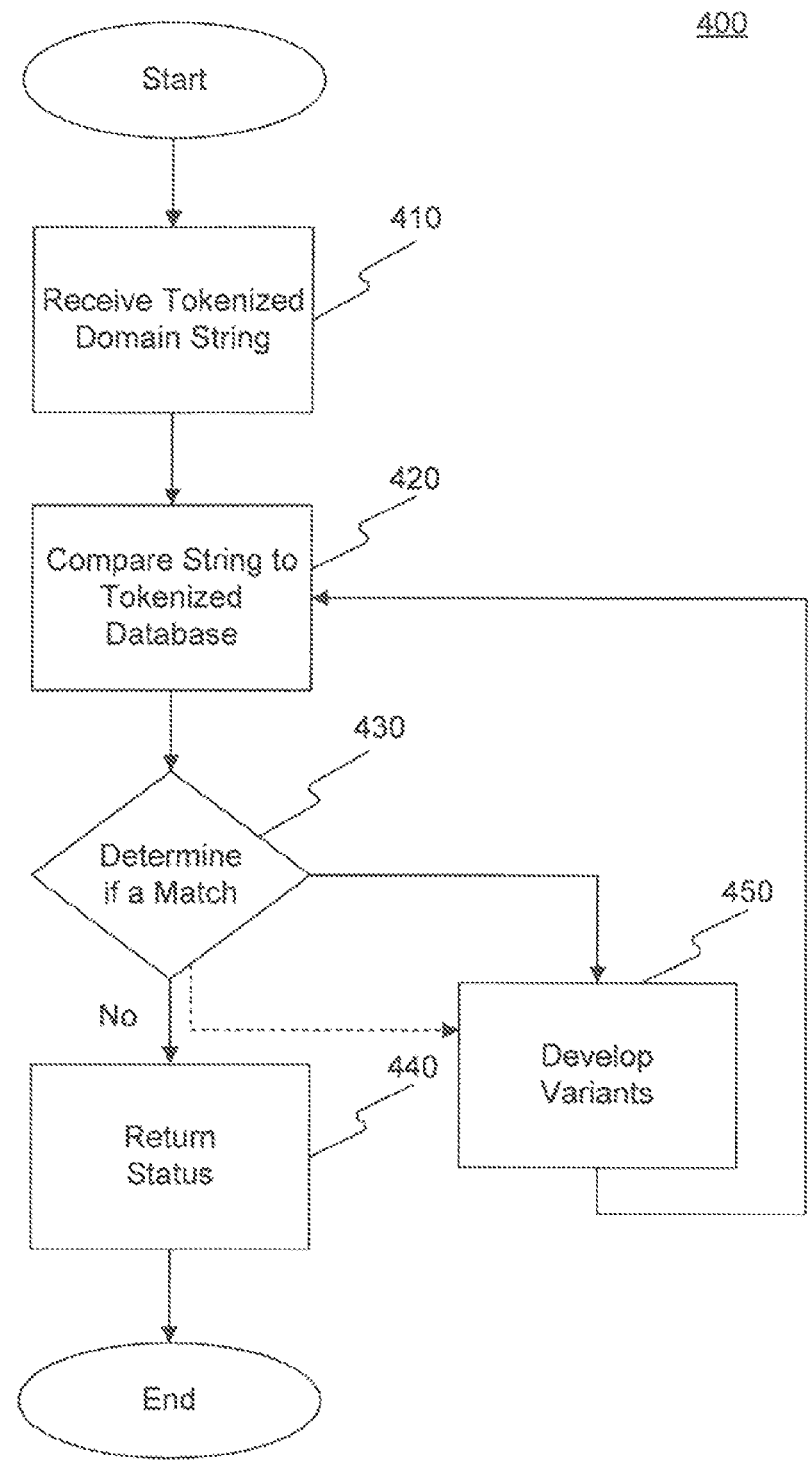
FIG. 4 illustrates an example process that uses tokenized domain names for domain name availability lookup, and includes techniques to suggest variants of the tokenized domain name submitted for lookup, according to implementations.

FIG. 4 illustrates an example process 400 that uses tokenized domain names for domain name availability lookup, and includes techniques to suggest variants of the tokenized domain name submitted for lookup. In step 410, the tokenized domain string is received by, for example, the tokenized list holder 150. The tokenized domain string may consist of one or more tokenized strings in addition to the desired TLD in the clear. For example, if the desired domain name was "ExampleName.com," then the tokenized domain string may comprise "ExampleName" in the tokenized format and an indicator that "com" is the desired TLD. Where step 220, as discussed above, splits the domain name prior to tokenization, the tokenized domain string may comprise multiple singular tokenized strings in addition to the indicator of the desired TLD. For example, if the desired domain string was "ExampleBlaster.com," then the strings "Example" and "Blaster" may both be tokenized individually, and the request may include both strings, an indicator of the order of the preference of the strings, an indicator of any desired separation characters such as a dash ("—"), and an indicator of the desired TLD.

In step 420, the tokenized list holder 150 may compare the received tokenized string or strings to the tokenized domain name database. In the case of multiple strings, the tokenized domain name database may support comparing multiple strings to the list of tokenized registered domain names. In other words, the tokenizing authority 140 may return tokenized versions of domain names consistently when processing a domain name that may be split. The database maintained by the tokenized list holder 150 may contain multiple versions of the same domain name, to support options such as split string tokenization and whole string tokenization. For example, when the process 200 is executing step 220 for domain names that have already been registered, the tokenizing authority 140 may return multiple versions of the tokenized domain string format for a particular domain name, e.g., for the domain name "ExampleBlaster.com," the tokenizing authority 140 may return one result for the entire string "ExampleBlaster.com," one result for a non-TLD-specific split string "ExampleBlaster" and a "com" indicator, and one result for a completely split string "Example," "Blaster," and an indicator for "com." By storing multiple versions of the same domain string, the one or more registries 130 can support varying levels of privacy preservation for domain name lookups, where less domain name splitting is presumed to be more private.

In step 430 of the example process 400, the tokenized list holder 150 evaluates whether a match exists. If no match is found, the desired domain name can be assumed to be available for registration. The status may be returned in step 440. If a match is found, the desired domain name can be assumed to be unavailable for registration. In either case, variants of the desired domain name may optionally be developed in step 450, for instance using techniques described in reference to FIG. 5, below.

Figure 5:
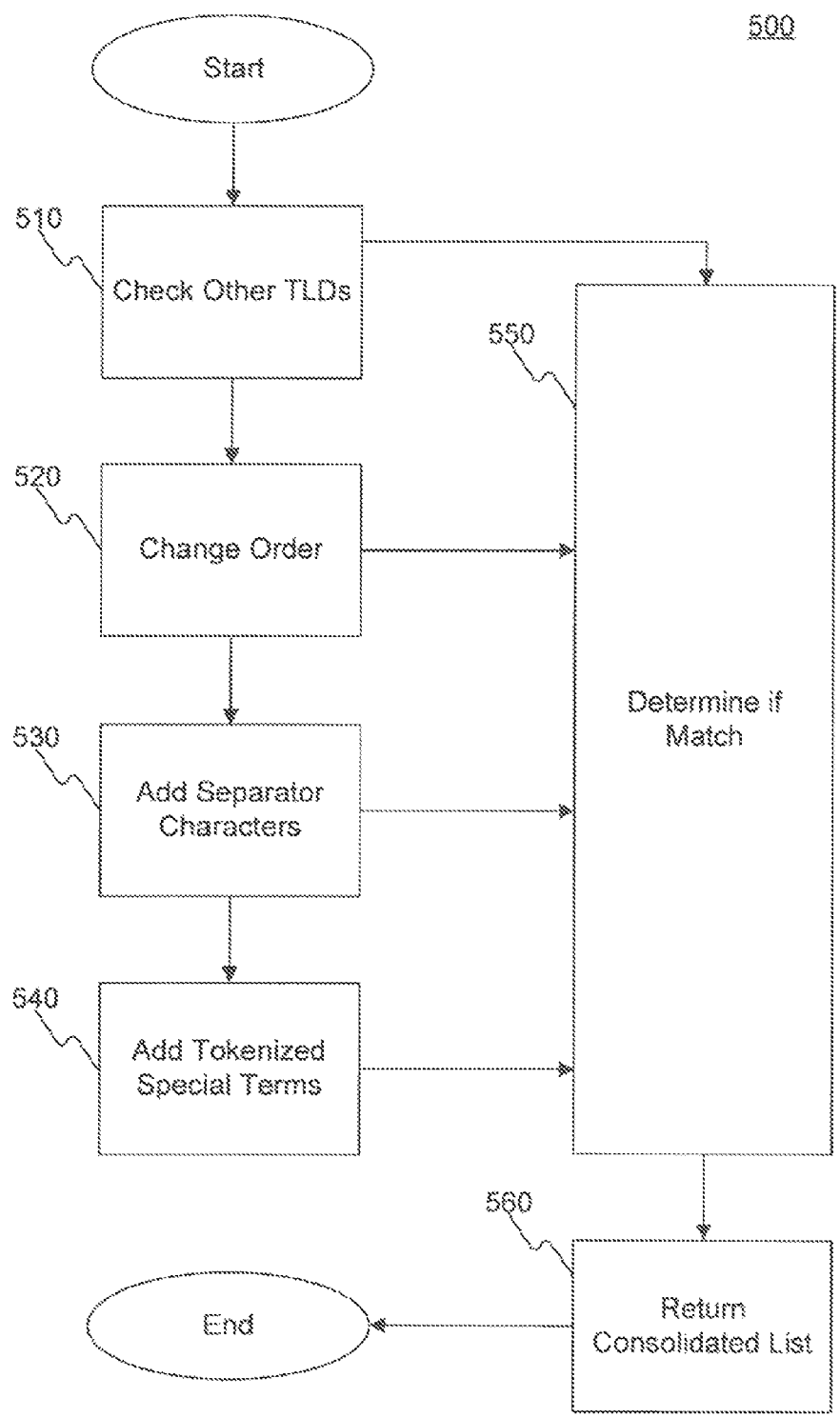
FIG. 5 illustrates an example process of developing variants for tokenized domain strings, according to implementations.

FIG. 5 illustrates an example process 500 of developing variants for tokenized domain strings. While one process for developing variants is shown, it will be appreciated that any suitable technique for generating domain name or other variants can be used. Variants are desirable in the event that a requested domain name is unavailable, but the privacy preserving nature of the inventive process may complicate efforts to develop variants when the requested domain name is unknown due to tokenization. But because the tokenizing authority 140 may support domain splitting prior to tokenization, the tokenized elements may be combined to develop variants. Thus, for example, even where the second level name is left intact, by splitting the requested TLD, alternative TLDs may be suggested as variants. In step 510, the tokenizing authority 140 may check the tokenized first level string against other TLDs that have been configured to support the privacy preserving domain name lookup. For example, where "ExampleName.com" is unavailable, the tokenized string corresponding to "ExampleName" could be compared against tokenized strings for .NET and the like.

In step 520, where the domain name lookup request includes multiple tokenized strings, the tokenizing authority 140 may develop variants by mixing the order of the tokenized strings. For example, if the availability of the domain name "ExampleBlaster.com" is requested and "Example" and "Blaster" were tokenized separately, then a variant could include "BlasterExample.com."

In step 530, where the domain name lookup request includes multiple tokenized strings, the tokenizing authority 140 may develop variants by including separator characters between tokenized strings. For example, if the availability of the domain name "ExampleBlaster.com" is requested and "Example" and "Blaster" were tokenized separately then a variant may include "Example-Blaster.com." Presently, the only non-alphanumeric character allowed in a domain name is a dash ("—"), but other separator characters may include characters such as "e," "o," "i," and so forth. For example, another variant of "ExampleBlaster.com" could be "ExampleEBlaster.com." One skilled in the art will understand the separator characters may include a string of any number of characters. In the case where separator characters are not tokenized, however, for practical purposes, the number of available separator character strings will likely be a limited set of characters because the tokenized list holder 150 must hold all the variants of registered domain names in a tokenized or partially tokenized form.

In step 540, where the domain name lookup request has at least been split at the TLD level, the tokenizing authority 140 may develop variants by including Internet-centric terms at the beginning or end of the domain name. For example, if the availability of the domain name "Example.com" is requested and "Example" was tokenized independently of the ".com," then a variant could include "NetExample.com" or "ExampleNet.com." This non-limiting example is merely indicative of the types of Internet-centric terms that may be considered. Other terms may also be considered, such as terms relevant to current events and the like.

In the case where the tokenized list holder 150 is the same entity as or related to the one or more registries 130, the tokenized list holder 150 may store tokenized versions of these terms without knowing which terms correspond to which tokenized version. For example, the tokenized list holder 150 may create a list of such terms and send the list to the tokenizing authority 140 for tokenization. The tokenizing authority 140 may tokenize the list of terms and return them in a random order. In step 540, the tokenizing authority 140 can create variants by adding the terms to the tokenized domain string or strings either before or after a tokenized string. The tokenized list holder 150 can then check these against the tokenized list, and because the tokenizing authority 140 can provide multiple tokenization results for a single domain name by splitting the domain name, the tokenized list holder 150 may find a match if the variants had already been registered. Conversely, the tokenized list holder 150 may not find a match if the variants had not been registered.

As part of step 220 of FIG. 2, the tokenizing authority 140 may preserve the list of terms and use the terms to create split points at those term boundaries. For example, if "net" is a term that was stored by the privacy preserving registry in tokenized form in its list of add-on terms, then in tokenizing the domain name "NetExample.com," the tokenizing authority 140 may reference the list of add-on terms and create a split boundary after "net." Thus, the tokenizing authority 140 may return tokenized strings for "net" and "example" and an indicator for the .COM TLD.

In step 550, the tokenizing authority 140 may determine which of the variants match tokenized registered domains from the tokenized database. One skilled in the art should understand that the list of developed variants may include techniques applied from any combination of the steps 510, 520, 530, and 540, and that such steps can be performed in any order, repeated any number of times, and applied in multiple instances to create, for example, variants of variants. Depending on the number of variants that were determined as available, the process can go back and calculate additional variants to attempt to find any available variants, or the process 500 can proceed to step 560 and deliver a list of available variant domain names.

Similarly to the example process 400 of FIG. 4, in step 560 of FIG. 5, the tokenizing authority 140 may develop variants regardless of whether the desired domain name was determined as available. In any case, however, the results or status may be returned as in step 540, including any suggestions based on variants of the requested domain name.

As noted, it will be appreciated that other techniques and approaches for developing variants for the domain name substrings or other components can be used. Those other techniques can be or include, for instance, those shown in co-pending U.S. application Ser. No. 9/070,038, filed Oct. 2, 2001, entitled "Determining Alternative Textual Identifiers Such As For Registered Domain Names," assigned or under obligation to the same entity as this application, which co-pending application is incorporated by reference in its entirety herein. Those other techniques can likewise include, for further instance, those shown in co-pending U.S. application Ser. No. 13/249,429, filed Sep. 30, 2011, entitled "Domain Name Tokenization and Alternative Domain Name Generation," assigned or under obligation to the same entity as this application, which co-pending application is likewise incorporated by reference in its entirety herein.

As discussed above, the tokenizing authority 140 must be considered a trusted entity because the tokenizing authority 140 receives the domain names in the clear and provides tokenized string(s) in response. In other words, in a traditional domain name availability lookup, the desired domain name may be shared with a registrar 120, one or more registries 130, and anyone who happens to intercept the query. With the use of a trusted tokenizing authority 140, however, only the tokenizing authority 140 has access to the domain name of interest and the communication between the potential registrant 110 and the tokenizing authority 140 may be made over a secured interface.

In some implementations (and in variations on some of the above implementations), however, the tokenizing authority 140 may never learn the domain name. For instance, prior to sending the domain name to the tokenizing authority 140, the user or registrant 110 may preprocess the domain name by blinding it using an appropriate homomorphism function on the input space of the tokenizing function. The tokenizing authority 140 then applies the tokenizing function to the modified input, returning the result. Because the blinding function is a homomorphism relative to the tokenizing function, the inverse unblinding function may be applied to the result to obtain the tokenized version of the domain name that would have been obtained without blinding. A tokenized list of registered domain names may optionally be generated by the tokenizing authority 140, using a similar blinding technique involving homomorphic functions. The user may then use the tokenized domain name to query the tokenized list holder 150, and determine whether the domain name has been registered or whether the domain name has corresponding associated information. The optional use of a blinding function can preserve the privacy of the domain name, both from the perspective of the registrant 110 and of the one or more registries 130.

Figure 6:
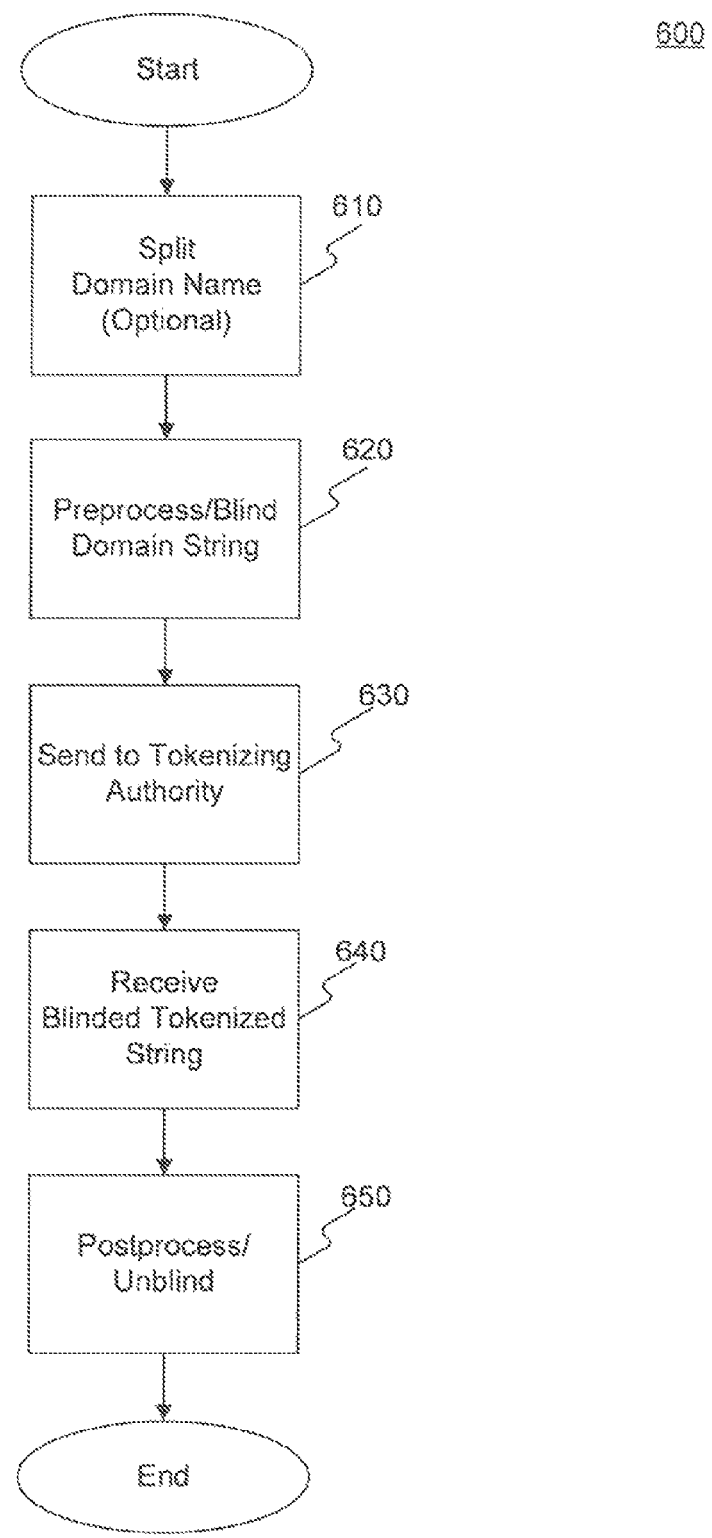
FIG. 6 illustrates an example process of performing a preprocessing blinding function on the domain name of interest from the perspective of a potential registrant, according to implementations.

FIG. 6 illustrates an example process 600 for performing a blinding function on the domain name of interest from the perspective of the potential registrant 110 (or other user). In optional step 610, the potential registrant 110 may if desired split the domain name into pieces for tokenization, for instance according to the processes 400 and 500 described above. In step 620, the potential registrant 110 may preprocess the domain name input string or strings by applying a blinding function. The blinding function may be a homomorphism of the tokenizing function used by the tokenizing authority 140. That is, in some example implementations, the blinding function must be reversible after tokenization has occurred to reveal the tokenized domain name. The blinding function may be seeded with a random number to prevent the tokenizing authority 140 from reverse engineering the input domain name, which may thereby remain confidential.

In step 620, the blinded input string or strings representing the domain name of interest are sent to the tokenizing authority 140. Once the tokenizing authority 140 has tokenized the input string or strings, it may return the tokenized result to the potential registrant 110 or the one or more registries 130, as in step 640. In step 650, the potential registrant 110 or the one or more registries 130 reverses the blinding function by applying a (post-processing) unblinding function to find the tokenized string or strings. These tokenized string or strings may then be submitted to the domain list holder 150, either directly or through an intermediary. From the perspective of the tokenizing authority 140, tokenizing a blinded input string is similar to the process 200 described in FIG. 2, with the exception that, because the input string is blinded, the tokenizing authority 140 cannot perform domain name splitting itself. The tokenizing authority 140 may, however, support domain name splitting if the domain name is submitted in a spilt format with each of the pieces separately blinded.

As an example of a typical blind signature technique, a first party, Alice, obtains the signature of a second party, Bob, on a message m via the following or similar steps. Alice first computes a blinded version m' of the message m, and sends m' to Bob. Bob then computes a signature s' on the message m using Bob's signature function, and returns s' to Alice. Alice then unblinds s' to recover s, the actual signature on m. One example of such a technique involves the RSA signature scheme, where Bob's signature function is $m'=(s')^d \mod n$ where (n,d) is Bob's RSA private key. Alice obtains Bob's RSA public key (n,e). An appropriate blinding function in this case is for Alice to compute $m'=mr^e \mod n$ where r is a random value between 0 and n−1. The signature s' can be unblinded by Alice by computing $s=s' r^{-1} \mod n$. (The well-known proof that unblinding reverses blinding is given by expanding the formulas: $s=s' r^{-1}=(m')^d r^{-1}=(mr^e)^d r^{-1}=m^d r^{ed} r^{-1}=m^d \mod n$.)

A blinding technique based on the RSA signature scheme may be employed in implementations of the present teachings as follows. First, the potential registrant 110 or the one or more registries 130 can apply a cryptographic hash function to the domain name to map it to a message m between 0 and n−1. Second, the potential registrant 110 or one or more registries 130 blinds the message m, computing m' as above, and sends m' to the tokenizing authority 140.

Third, the tokenizing authority 140 computes the signature s' on the blinded input m', and return s' as the blinded output. Fourth, the potential registrant 110 or one or more registries 130 unblinds the blinded output s', obtaining the actual signature s as above. Fifth, the potential registrant 110 or one or more registries 130 applies a cryptographic hash function to the signature s (and possibly other inputs) to map it to a tokenized domain name. Thus, one implementation may have $m=H_1$ (domain name) where $H_1$ is a first hash function, and tokenized domain name $H_2(s)$ where $H_2$ is a second (optionally distinct) hash function.

In addition to mapping to an integer in the appropriate range, the first cryptographic hash function also helps ensure that non-matching domain names are unlikely to produce matching tokenized domain names due to "collisions" in the tokenization process, such as when two distinct inputs produce the same (or similar) output over the portion of the tokenized output used for comparison.

The second cryptographic hash function helps ensure that it is difficult for an intercepting party to determine whether a tokenized domain name corresponds to a given domain name without consulting the tokenizing authority 140 at some point.

It may be noted that because the RSA signature scheme is deterministic (same input m produces same output s), the tokenizing function defined here will also be deterministic. This feature ensures that matching domain names always produce matching tokenized domain names.

Other blinding techniques with similar properties to the RSA signature scheme, along with associated blinding and unblinding functions, may also be employed in the tokenization process within the scope of the present teachings. For instance, the RSA signature scheme as described above may be altered by employing a different, or, depending on the format of the domain name, no function in the cryptographic first step, and a different, or no, function in the cryptographic fifth step.

Finally, it may also be noted that for the purposes of the disclosure, it is not necessary that the tokenizing process be reversible. That is, even the tokenizing authority 140 need not be able to recover the domain name from the tokenized domain name. The tokenizing process only needs to be able to map domain names forward to tokenized domain names, which can then be compared while preserving the privacy of the domain names, themselves.

Optionally, the one or more registries 130 can operate in a similar fashion as the potential registrant 110, as far as using blinding functions on domain names to be tokenized. If domain name splitting is desired, similar to the domain name registrant, the one or more registries 130 can perform the splitting step. The tokenizing authority 140 can in such cases simply tokenize all the blinded split domain names, and return those to the one or more registries 130. The list of terms that can be used to create domain name variants as in step 540 may still be used in a similar way as if the domain name strings were not blinded.

In some implementations, other information may be obtained using similar processes as those described above. For example, as referenced in the descriptions of the implementations above, rather than a potential registrant 110 searching for an available domain name, a data-requesting user 110 could search for information related to a registered domain name, such as an IP address, yet keep the nature of the query private. In addition to a list of tokenized registered domain names, the tokenized list holder 150 may also maintain a corresponding set of encrypted data associated with the registered domain. Using similar techniques as described above (such as a one-way function with an optional blinding function), a user or the one or more registries 130 could obtain an encryption or decryption key by which to encrypt or decrypt encrypted data associated with a registered domain. For these implementations, the registrant 110 may be considered more broadly as a user searching for information about a domain name. Likewise, a registrar 120 or one or more registries 130 may both be considered as domain information holders with which the user (registrant 110) may interact to request information pertaining to a particular domain name, while preserving privacy of the request. In those types of implementations, the tokenizing authority 140 operates in substantially the same way as described above. In some implementations, the tokenizing authority 140 may operatively be or include the same entity as the registrar 120 or one or more registries 130, particularly when a blinding function is used to protect from disclosing the domain name to the tokenizing authority 140.

Figure 7:
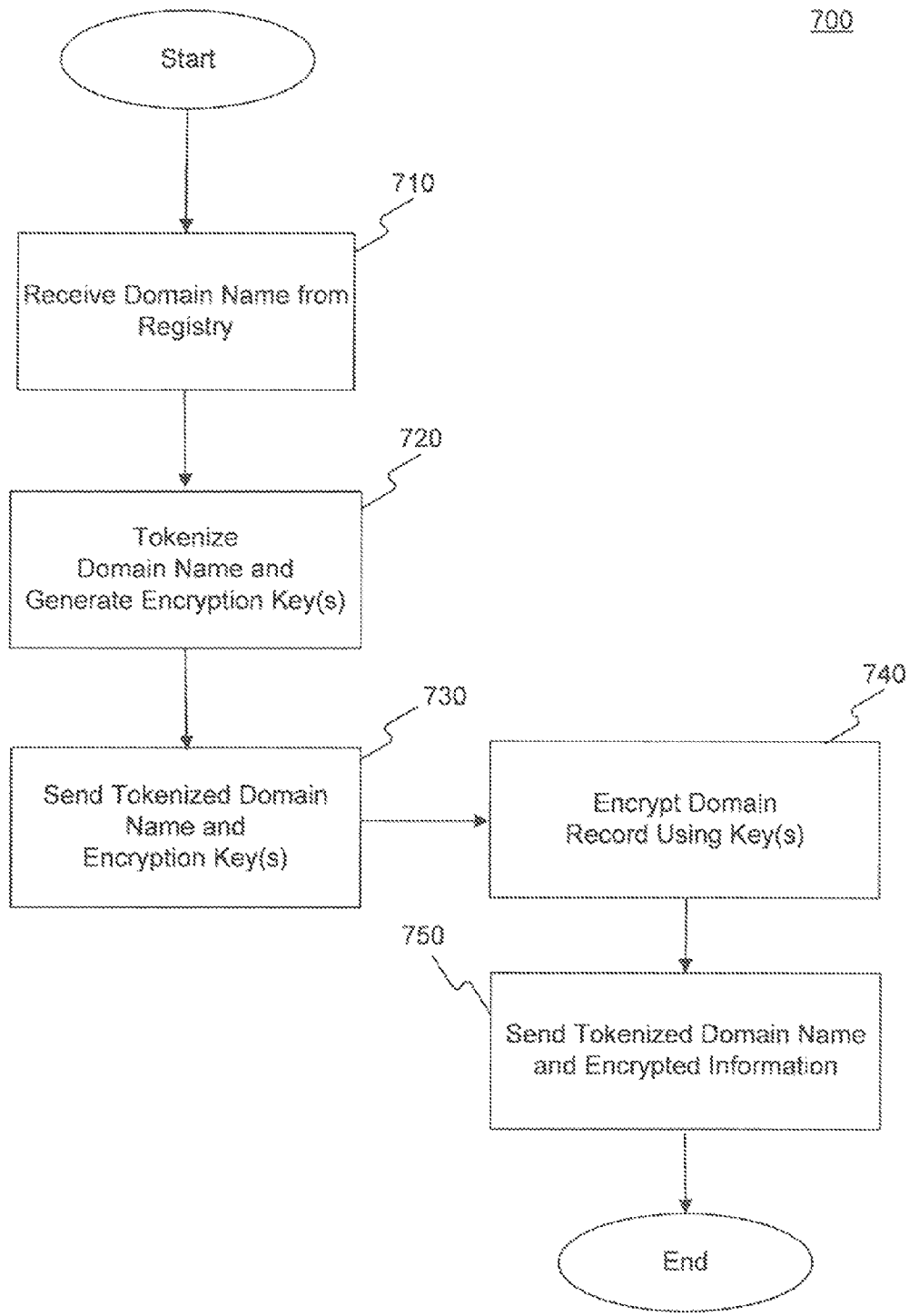
FIG. 7 illustrates an example process that receives a domain name and associated domain name information and processes the received data so that the domain name information can be made available in an encrypted format.

FIG. 7 illustrates an example process 700 that receives a domain name and information associated with or corresponding to the domain name, and processes the received data so that the domain name information may be made available in an encrypted format. Because of the encrypted format, users 110 are unable to recover the underlying information without first obtaining a corresponding decryption key. In step 710, the tokenizing authority 140 may receive a domain name from the domain name's registry 130 (or a registrar 120 should circumstances permit). The domain name is tokenized in step 720. It may be noted that because domain name variants would not generally be desired as described above, the tokenization process would not typically perform splitting on the domain name to generate multiple tokenized formats. However, splitting may still be done if domain name variants would be desired for some reason. Also in step 720, one or more encryption keys are generated from the domain name for use in optionally encrypting some or all of the domain name information. In step 730, the tokenized domain name and encryption key are returned to the one or more registries 130. In step 740, the one or more registries 130 may encrypt one or more parts of the related domain name information. In step 750, the one or more registries 130 may send the domain name information (encrypted or not) and the tokenized domain name to the tokenized list holder, e.g., tokenized list holder 150.

In alternative implementations, the tokenizing authority 140 can receive the domain name and the related information, generate the tokenized domain name and encryption key(s), use the key(s) to optionally encrypt all or some of the related domain information, and either return the tokenized domain name and optionally encrypted related information or send the tokenized domain name and optionally encrypted related information to the tokenized list holder 150.

Figure 8:
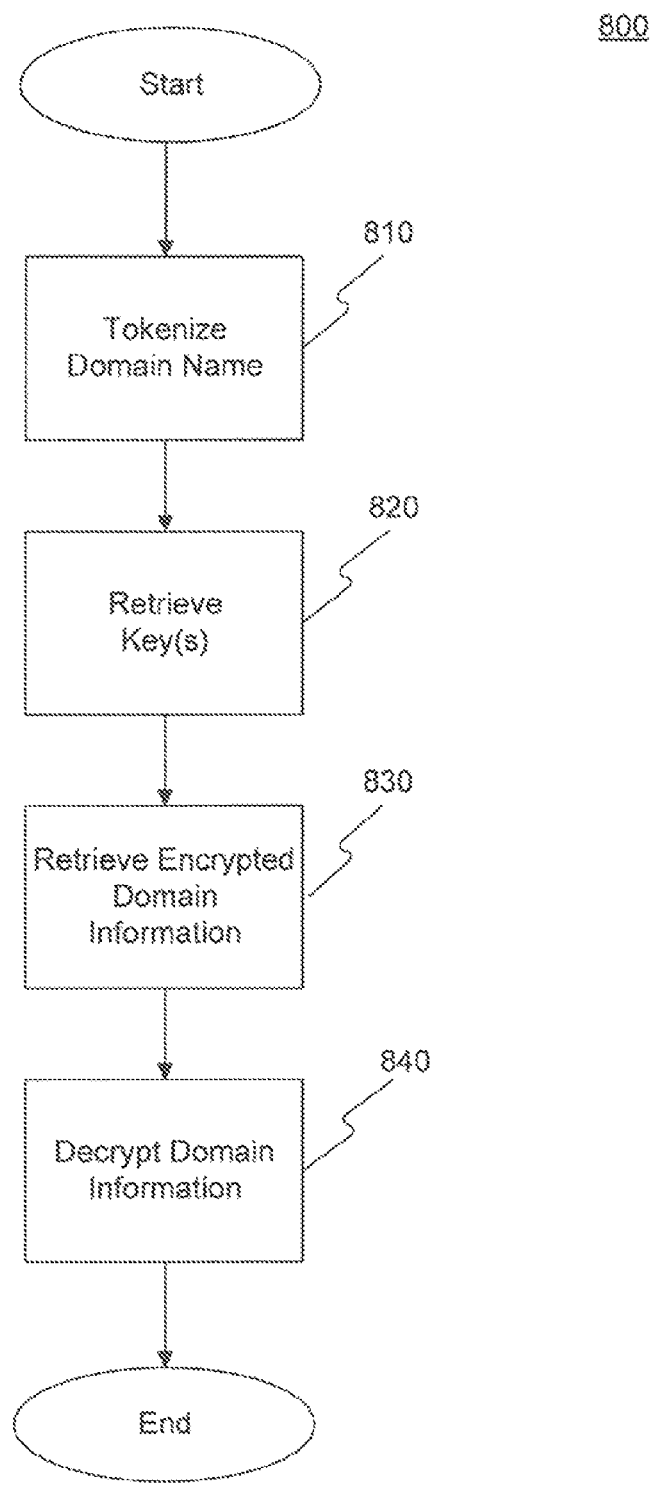
FIG. 8 illustrates an example process that uses privacy preserving techniques to find information associated with or corresponding to a domain name.

FIG. 8 illustrates an example process 800 that uses privacy preserving techniques to find information corresponding to or associated with a domain name. In step 810, a user may tokenize a domain name via a tokenizing authority 140. Similar to the process 200 described above, the tokenizing authority 140 would use a tokenizing function on the submitted domain name and return a tokenized string of characters representing the domain name. In some implementations, further privacy preserving techniques may take place by using a blinding preprocessing function consistent with the process 600 described above. In step 820, the user may use the domain name (or tokenized domain name) to obtain the decryption key(s) corresponding to the domain name from the tokenizing authority 140. The decryption key(s) may be returned along with the tokenized domain name in step 810. In implementations with further privacy preserving techniques, the user may obtain the decryption key(s) without the tokenizing authority learning the key(s) or the domain name. In step 830, the optionally encrypted related domain information may be retrieved from the tokenized list holder 150 based on the tokenized domain string. One skilled in the art will recognize that one tokenized list holder 150 may store the tokenized domain names and another tokenized list holder 150 may store the optionally encrypted domain related information. Using the decryption key, the domain related information is decrypted in step 840.

The implementations disclosed above may be monetized by providing the privacy preserving registry browsing service as a fee-based service. In particular, a registrar 120 or one or more registries 130 supporting a tokenized database of domain names and corresponding information, as well as a tokenizing authority 140 may each require subscriptions and/or payment for private domain name queries. Alternatively, an account may be held with one of these entities which collects the fees and distributes them to the other entities. A service offering privacy preserving registry browsing may charge users on a subscription or per use basis. Alternatively, a third-party account manager may serve as an intermediary between a potential registrant 110 or domain name information browser and the tokenizing authority 140 or other entity or service. The third-party account manager could serve as an additional abstraction buffer between the security conscious user and the one or more registries 130 or registrar 120. In the case where the tokenizing authority 140 is trusted, the tokenizing authority 140 may be a good candidate to serve as an account manager for the purpose of monetizing privacy preserving registry browsing. Furthermore, even if monetary gain is not a primary objective, it may beneficial in terms of preserving privacy for access to the tokenizing authority 140 to be limited to a certain number of transactions per party over a given period of time, to avoid online dictionary attacks. For example, if the tokenized list holder 150 has unlimited access to the tokenizing functionality, then it may be able to determine the domain name that a user is searching for, and/or the domain names provided by the registrar 120, by trial and error. With access limits, such types of exhaustive search would be detected or slowed.

Although the disclosed implementations above preserve the privacy of the domain name lookup whether for purposes of registration or information gathering, some data may be collected and analyzed to further promote the usefulness of the embodied systems. For example, the supporting registrar 120 or one or more registries 130 may log information that a query was performed, log the tokenized query string, and log the calculations and responses as appropriate for analysis later. If an account is required by the supporting registrar 120 or one or more registries 130, the log information can be tied to a particular account holder. The collected data can be correlated to domain name registrations and lookup requests that are performed in the clear. Additionally, trending analysis may be done to determine how many private operations are performed by a single user session. It may also be determined whether any domain name variants that were suggested were specifically searched in the same or in a later session.

Figure 9:
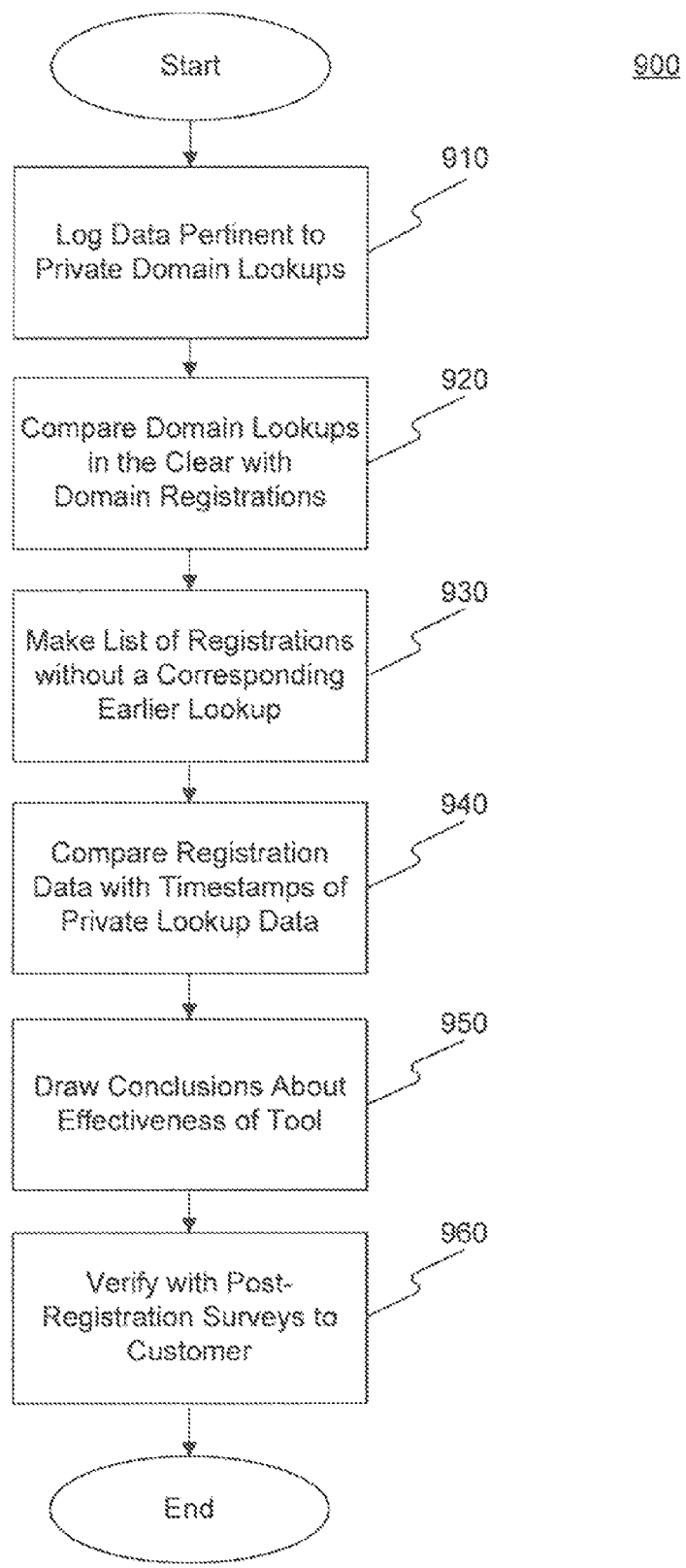
FIG. 9 illustrates an example process of correlating log data to determine the effectiveness of a privacy preserving registry browser.

FIG. 9 illustrates an example process 900 of correlating log data to determine the effectiveness of a privacy preserving registry browser. In step 910, data pertinent to the privacy preserving registry browser operation can be logged on a continuous basis, for instance by the tokenizing authority 140 and/or other entity or service. Such data may include logging the tokenized query string, the number of domain name variants created and eliminated as unavailable (where applicable), timestamps corresponding to the lookup process, and the like. In step 920, domain lookups in the clear are compared with domain registrations. Typically, a user 110 will look up whether a domain name is available prior to registration. If the lookup request was performed privately, an orphaned domain registration (one without a corresponding lookup request) may have been performed via the privacy preserving registry browser. In step 930, a list of such orphaned domain names may be made, for instance again by the tokenizing authority and/or other entity or service. Orphaned domain registration timestamps may be compared to timestamps from private domain lookup requests to further correlate the queries, as in step 940. If an account is required to perform private lookups, registrations made by the same organization would help to further correlate private lookups with subsequent registrations. Alternatively, once a list of orphaned domain names is available from step 930 and possibly narrowed through timestamp comparison as in step 940, the privacy preserving registry may submit the registered domain names to the tokenizing authority 140 and cross-reference the resulting tokenized domain strings to determine whether the strings were previously queried. (It should be understood that because the correlation can be performed only after the domain name has been registered, the requester's initial search for the domain name still remains private while the search is occurring. Moreover, if the requester checks whether several domain names have been registered prior to choosing and registering one, the alternate domain names checked but not registered also remain private.)

In step 950, conclusions may be made, by the tokenizing authority 140 and/or other entity or service, about the effectiveness of the privacy preserving registry browsing tool. Conclusions would likely be drawn upon whether the data could be correlated to reveal an approximate number of private lookups that resulted in subsequent registrations. In step 960, post registration surveys may optionally be sent to the customer to help verify the conclusions about the effectiveness of the privacy preserving registry browsing tool.

While FIG. 9 illustrates certain illustrative logging and inference techniques, other techniques related to logging data related to the tokenization and registration process can be used. For instance, logging, inference, and other associated techniques such as those described in U.S. Pat. No. 8,224, 023, issued Jul. 17, 2012, entitled "Characterizing Unregistered Domain Names," and in co-pending U.S. application Ser. No. 12/755,049 filed Apr. 6, 2010, entitled "Domain Popularity Scoring," each of which is assigned or under obligation to the same entity as this application, and each of which is incorporated by reference in its entirety herein, can also or instead be used.

Although the foregoing descriptions have generally related to domain name queries, it is understood that the methods and systems may also be applied for preserving privacy of queries in a general sense, and/or for other specific types of data. In the general sense, a requester (e.g., potential registrant 110) makes queues (e.g., domain name queries) for availability of or information about a particular type of private data (e.g., domain names) in a data list or source (e.g., registry 130). Examples of other data types include IP addresses, email addresses, phone numbers, malware attack signatures, trademark strings, and other data types where it is useful to have a way to compare matches among data values, and optionally to convey additional data associated with those values, while preserving privacy.

For instance, security providers may wish to share with subscribers information about potentially suspicious IP addresses and malware, such that the subscribers only learn that information if they have also arrived at the same suspicion, i.e., if they already know the IP address or malware attack signature. Similarly, merchants may wish to share with web sites the email addresses and phone numbers of their customers, such that the web sites only learn that there is a match if they already know at least some of the information themselves. For example, the email addresses and phone numbers may both be employed separately as query terms, with the corresponding information included as additional related data, optionally encrypted. The methods and systems herein can be applied in such cases as well.

The data source may interact with a tokenizing authority to obtain tokenized versions of its data; the data source may provide the tokenized versions to a tokenized data holder; the requester may also interact with a tokenizing authority to obtain tokenized version of its data; the requester may provide the tokenized versions to the tokenized data holder; and the tokenized data holder may compare the requester's tokenized version to the data source's tokenized version and return the results of the comparison to the requester. In addition, a proxy server may perform one or more of the operations of the data source or data requester. For instance, the data source or data requester may provide a query term to the proxy server, which then acts on behalf of the data source or data requester by interacting with the tokenizing authority and/or tokenized data holder as described herein. The proxy server thus serves as an extension of the data source or data requester. This may be beneficial if the data source or data requester has limited computational capabilities or constraints on its interactions that can be ameliorated by outsourcing operations to the proxy server.

As in the implementations described above, the interactions may be extended to convey data related to the query (or metadata), which may also be encrypted. In cases, the data source's interactions with the tokenizing authority for a given query term may also produce an encryption key; the data source may encrypt metadata values associated with the query term with the encryption key; the data source may provide the encrypted metadata values to the tokenized data holder; the requester's interactions with a tokenizing authority for a given query term may produce a corresponding decryption key; as a result of a successful comparison, the tokenized data holder may provide the encrypted metadata value to the requester; and the requester may decrypt the encrypted metadata value with a decryption key.

The interactions with the tokenizing authority may employ blinding and unblinding operations to preserve privacy of data values, tokenized data values, and encryption keys, relative to the tokenizing authority. They can also employ metering and other access controls to strengthen privacy protections further against attempted compromise by a requester, data source, or other party. In some cases, the functions of more than one actor can be realized by the same party in an actual implementation.

The methods and systems have been generally described in terms of a single instance of each of the actors: data source, registrant 110 or other requester 110, registrar 120, registry 130, tokenizing authority 140, and tokenized list holder 150. However, it will be appreciated that the methods and systems herein can also support multiple instances and/or combinations of those entities. For instance, more than one requester can interact with the same tokenizing authority 140, and provide tokenized values to be matched by the same tokenized list holder 150. Likewise, more than one data source can interact with the same tokenizing authority 140 and provide tokenized values to the same tokenized list holder 150. Thus, a single tokenizing authority 140 and tokenized list holder 150 can enable not just a single requester and source to preserve the privacy of their queries, but a community of requesters and data sources. The methods and systems thus enable an ecosystem where multiple requesters and data sources can compare matches among data values and convey additional metadata.

Furthermore, because of the intermediation by the tokenizing authority 140 and the tokenized list holder 150, not only can the privacy of the data values and metadata values be preserved, but also the identifies of the requesters and the data sources. In some applications, a data source may prefer not to disclose its identity directly to requesters, but may be willing to do so to an intermediary. The tokenized list holder 150 thus acts a representative of the community of data sources, concealing their actual identities from the requesters, yet still being able to compare values on the requesters' behalf. It likewise acts as a representative of the community of requesters, concealing their identities, yet still being able to compare values and report aggregate results back to the data sources.

Although a single tokenizing function is sufficient to enable multiple requesters and data sources, it may be beneficial to have multiple tokenizing functions. Different tokenizing functions may be employed at different points in time, to reduce concern about the compromise of secret keys associated with the functions. Different functions may be employed for data values of different classifications, which may be based on security attributes, geolocation, or other factors. The data source may select one or more tokenizing functions to employ for a given data value based on the classification(s) of the data. Likewise, a requester may select one or more tokenizing functions based on the requester's permissions to access data values of certain classification(s). A requester may thus only learn that its data value matches a data source's data value if the requester has permission for the tokenizing function associated with appropriate classification. Furthermore, different tokenizing functions may be employed for determining encryption or decryption keys depending on metadata classification, and the tokenizing function for determining the tokenized query term may be different than the tokenization function(s) for determining the associated encryption or decryption key(s). Different metadata associated with the same data value may have different classifications and would then be encrypted with different keys. Thus, even if a requester is able to learn that its data value matches a data source's data value, the requester may only obtain associated metadata on a "need-to-know" basis.

The multiple tokenizing functions may be assigned to a single tokenizing authority 140, or they may be assigned to two or more different tokenizing authorities 140. Further, although a single tokenized list holder 150 is sufficient to enable multiple requesters and data sources, it may likewise be beneficial to have multiple tokenized list holders 150 for similar reasons to those just described. Access to different tokenized list holders 150 may similarly be controlled based on classifications and permissions.

In addition to returning an indication of whether a comparison has been successful, and optionally encrypted metadata values, the tokenized list holder 150 may also return, depending on the requester's permission, other information it may have stored about the match. For instance, the tokenized data holder or tokenized list holder 150 may also return to the requester 110 the number of matches it has seen for the particular tokenized data value (even as it may provide such aggregate results back to the data sources). The number of matches seen may be useful information to the requesters 110 (and data sources), as it gives an indication of what other requesters 110 or data sources are querying. Thus, the response to a requester's query is not limited to matching or metadata, but may include other information that can be provided by the tokenized list holder 150.

Various enhancements may be employed to strengthen security further using techniques known in the art. For instance, the tokenizing function and its secret key(s) can be distributed using threshold cryptography across multiple servers, such that at least a designated subset of those servers must participate in the process of computing the function. This reduces concern about the compromise of secret key(s) or key shares stored at any smaller subset of servers.

In some implementations, a requester 110 may send a query term to a tokenizing authority 140 to calculate a decryption key for decrypting associated encrypted metadata held by a data store operator. The query term may be submitted without tokenization to the data store to retrieve the encrypted record associated with the query term. The requester 110 may use the calculated decryption key to decrypt the metadata.

Other implementations of the disclosure will be apparent to those skilled in the art from consideration of the specification and practice of the implementations disclosed herein. In particular, it should be appreciated that the processes defined herein are merely examples, and that the steps of the processes need not necessarily be performed in the order presented. It is intended that the specification and examples be considered as examples only, with a true scope and spirit of the implementations being indicated by the following claims.

What is claimed is:

1. A method for preserving privacy of a domain name related request, comprising:
    receiving, at a computer, a client computer request for information related to a domain name, wherein the request comprises at least one tokenized string representing the domain name, wherein the tokenized string was tokenized by a first tokenizing authority computer different from the client computer and operatively coupled to the client computer through a network, wherein the tokenized string was tokenized by a tokenizing authority computer at least in part by application of a cryptographic function, wherein the request comprises a request to determine domain name registration availability;
    comparing, via the computer, the at least one tokenized string to the store of tokenized strings, wherein the tokenized terms have been tokenized by a second tokenizing authority based on a tokenizing function equivalent to a tokenizing function of the first tokenizing authority, wherein the second tokenizing authority computer is different from the client computer and from the store of tokenized strings;
    determining if the at least one tokenized string is contained in the store of tokenized strings; and
    returning an indication whether the at least one tokenized string is contained in the store of tokenized strings.

2. The method of claim 1, wherein the information related to a domain name comprises a fully qualified domain name.

3. The method of claim 2, wherein the information related to a domain name comprises a portion of the domain name.

4. The method of claim 1, wherein the tokenized string is determined from the domain name using a blinding function and an unblinding function.

5. The method of claim 1, wherein the domain related request comprises a request for encrypted information related to a domain name.

6. The method of claim 5, further comprising:
    if the at least one tokenized string is contained in the store of tokenized strings, determining whether the encrypted information is available, and returning the encrypted information.

7. A system for preserving privacy of a domain name related request from a client computer comprising:
- an interface to a tokenized list holder storing a list of tokenized domain names, wherein the tokenized domain names have been tokenized by a first tokenizing authority based on a tokenizing function equivalent to a tokenizing function of the a second tokenizing authority, wherein the first tokenizing authority computer is different from the client computer and from the tokenized list holder; and
- a second tokenizing authority server different from a client computer and operatively coupled to the client computer through a network, wherein the tokenizing authority server is configured to—
  - receive a string representing a domain name,
  - perform a tokenizing function on the string, wherein the tokenizing function comprises a cryptographic function, and
  - transmit the tokenized string to a requester, and
- wherein the tokenized list holder is configured to—
  - receive a request to determine domain name registration availability comprising the tokenized string,
  - compare the tokenized string to the list of tokenized domain names,
  - determine if the tokenized string is contained in the store of tokenized domain names, and
  - generate an indicator indicating whether the tokenized string is contained in the store of tokenized domain names.

8. The system of claim 7, wherein the string comprises a fully qualified domain name.

9. The system of claim 7, wherein the string comprises a portion of a domain name.

10. The system of claim 7, wherein the string representing a domain name is determined from the domain name using a blinding function and the tokenized string is determined using an unblinding function.

11. The system of claim 7, wherein the domain name related request comprises a request for encrypted data pertaining to a domain name.

12. The system of claim 11, wherein the tokenizing authority server is further configured to:
- generate and transmit a set of key information for encrypting or decrypting the data pertaining to the domain name to the requester.

13. The system of claim 12, wherein the tokenized list holder is further configured to—
- determine whether the encrypted data is available, and
- return the encrypted data.

14. The system of claim 12, wherein the system is further configured to—
- determine whether the set of key information is available for the requester, and
- access the set of key information if available.

15. A computer-readable medium containing instructions, which, when executed by a processor, perform a method for preserving privacy of a domain name related request, the method comprising:
- receiving, at a computer, a request from a client computer for information related to a domain name, wherein the request comprises at least one tokenized string representing the domain name that was tokenized by a first tokenizing authority computer different from the client computer and operatively coupled to the client computer through a network, wherein the tokenized string was tokenized by a tokenizing authority computer at least in part by application of a cryptographic function, wherein the request comprises a request to determine domain name registration availability;
- comparing, via the computer, the at least one tokenized string to a store of tokenized strings, wherein the tokenized strings of the store of tokenized strings have been tokenized by a second tokenizing authority based on a tokenizing function equivalent to a tokenizing function of the first tokenizing authority, wherein the second tokenizing authority computer is different from the client computer and from the store of tokenized strings;
- determining if the at least one tokenized string is contained in the store of tokenized strings; and
- returning an indication whether the at least one tokenized string is contained in the store of tokenized strings.

* * * * *